Patented July 22, 1930

1,771,089

UNITED STATES PATENT OFFICE

HANS JORDAN, OF BERLIN-STEGLITZ, GERMANY, ASSIGNOR TO FIRM: CHEMISCHE FABRIK AUF ACTIEN (VORM. E. SCHERING), OF BERLIN, GERMANY

PRODUCTION OF HYDROGENATED PHENOL COMPOUNDS

No Drawing. Original application filed July 5, 1927, Serial No. 203,681, and in Germany July 14, 1926. Divided and this application filed March 20, 1928. Serial No. 263,207.

My invention refers to the production of chemical products, more especially alkylated phenols and their products of hydrogenation In my copending application for patent of the United States filed July 12, 1926, Serial No. 122,031, and entitled "Production of alkylated phenols," I have described a process of producing alkylated phenols by treating a product of condensation of a ketone and a phenol with hydrogen in the presence of a catalyst until two hydrogen atoms have been fixed.

I have now ascertained that by treating with hydrogen other derivatives of dihydroxy diphenyl methane, for instance the products of condensation of an aldehyde and a phenol, having the formula

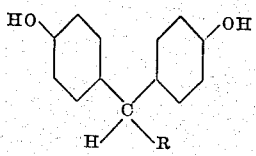

wherein R is hydrogen, an alkyl, or an aryl, until fourteen hydrogen atoms have been fixed, valuable products can be obtained.

Example 1 p-dihydroxy diphenyl methyl methane is treated with hydrogen under pressure at a temperature of about 170° C. in the presence of about 1 per cent of its weight of a nickel catalyst containing manganese, until 14 hydrogen atoms have been fixed. There is obtained cyclo-hexanol and 4-ethyl-cyclohexanol.

Example 2 p-dihydroxy diphenyl methane is treated as described with reference to Example 1, until 14 hydrogen atoms have been fixed. There results besides cyclohexanol 4-methyl cyclohexanol.

The catalysts mentioned above are prepared in the manner which is usual in the preparation of hydrogenation catalysts by precipitating from solutions of catalytically active metals the hydroxides or carbonates, which are then ready for direct use or may first be subjected to a reduction treatment. The term "hydrogenation catalyst" used in the claims is intended to include products answering the above description.

In the claims the term "dihydroxy diphenyl methane" is intended to include the alkyl derivatives.

Various changes may be made in the details disclosed in the foregoing specification without departing from the invention or sacrificing the advantages thereof.

I claim:—

1. The method of producing hydrogenated phenol compounds comprising treating a dihydroxy diphenyl methane with hydrogen under pressure in the presence of a hydrogenation catalyst at a temperature of about 170° C., until 14 hydrogen atoms have been fixed.

2. The method of producing hydrogenated phenol compounds comprising treating p-dihydroxy diphenyl methane in the presence of a hydrogenation catalyst at a temperature of about 170° C. with hydrogen under pressure, until 14 hydrogen atoms have been fixed.

In testimony whereof I affix my signature.

HANS JORDAN.